Figure 1:
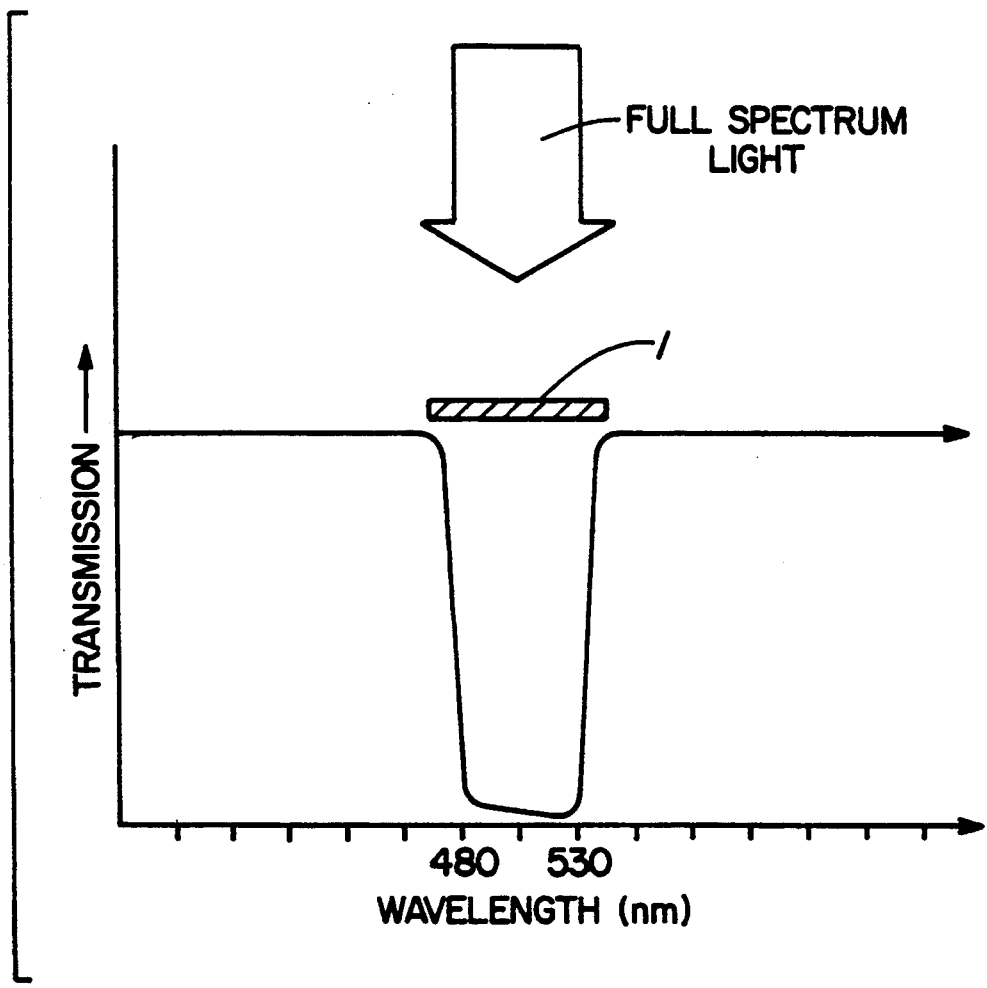

United States Patent [19]
Waldman

[11] Patent Number: 5,402,190
[45] Date of Patent: Mar. 28, 1995

[54] BIOLOGICAL CYCLE AFFECTING GOGGLES

[75] Inventor: Murray M. Waldman, Winnipeg, Canada

[73] Assignee: Suzanne Maureen Waldman, Winnipeg, Canada

[21] Appl. No.: 959,651

[22] Filed: Oct. 13, 1992

[30] Foreign Application Priority Data

Oct. 16, 1991 [CA] Canada .................................. 2053566

[51] Int. Cl.$^6$ .......................... G02C 7/10; G02C 7/04; G02C 7/06
[52] U.S. Cl. ..................................... 351/163; 351/41; 351/162; 351/164; 351/177
[58] Field of Search ................. 351/162, 163, 41, 177, 351/164

[56] References Cited

U.S. PATENT DOCUMENTS 4,952,046 8/1990 Stephens et al. ............... 351/162 X
5,218,386 6/1993 Levien .................................. 351/163

Primary Examiner—Scott J. Sugarman
Attorney, Agent, or Firm—Pascal & Associates

[57] ABSTRACT

A method of avoiding the influence of light on the biological clock caused by the presence of full spectrum light during intervals unexpected by the human body is comprised of wearing goggles that substantially block light having wavelengths of between about 480 and 530 nm. during exposure to the light, while conducting normal activities using visible light of other wavelengths.

18 Claims, 1 Drawing Sheet

BIOLOGICAL CYCLE AFFECTING GOGGLES

FIELD OF THE INVENTION

This invention relates to a method of avoiding the influence of light on the biological clock at times when such exposure would inappropriately and undesirably affect circadian rhythms, and thus the avoidance of onset of jet-lag (formally referred to as "desynchronosis"), or shift lag, or other undesirable affects caused by physiological (biological) processes being out of synchrony with the desired sleep-wake cycle in humans.

BACKGROUND OF THE INVENTION

Shift workers, pilots and long distance east-west airline passengers all suffer from a common problem, a functional disorder resulting from the desynchronization of activity and alertness cycles with the sleep-wake cycle which is ordinarily controlled by the light-dark cycle. When the body expects it to be dark, sunlight is experienced instead. As alertness and sleepiness are controlled by the light-dark cycle, and as the internal body clock is susceptible to being reset by light during subjective night, it is desirable to avoid light capable of resetting the biological clock (the SCN) to times that are inappropriate for activities in the local environment. Thus, if one wants to maintain an alertness cycle which is out of phase with the light-dark cycle, or if one wants to adjust rapidly to time zone changes, it is necessary to avoid light capable of resetting this internal clock at times when the light will influence the resetting of the clock in an undesirable manner.

This desynchronization of the sleep-wake cycle from the desired activity cycle results in sleepiness at times when alertness is necessary, abnormal sleep patterns, inability to concentrate, reduced mental capacity (both in judgement and in memory), and agitation and/or depression in some individuals. These symptoms, experienced by travellers rapidly crossing a number of time zones, sometimes referred to jet-lag, can cause danger to persons in an aircraft, if the person suffering the jet-lag is the pilot, or reduced functioning by businessmen or government negotiators upon arrival.

If this desynchronization is maintained over long periods of time, as is experienced by rotating shift workers or night workers, it is sometimes referred to as shift lag. This condition is associated with an increased incidence of health problems such as gastrointestinal disorders including ulcers, and cardiovascular disorders such as heart disease, in addition to the reduced functioning referred to above. This reduced functioning is associated with increased accidents and reduced performance resulting in estimated economic costs of seventy billion dollars per year.

In order to avoid the jet-lag or shift lag, sufferers (in laboratory trials) have been told to avoid all sunlight and/or wear welders' goggles which effectively reduces the amount of light to a level at which a person cannot function, drive a car, read instruments, read, fly an airplane, etc.

SUMMARY OF THE INVENTION

I have discovered that persons can function normally in the changed light-timing environment, so long as light between about 480 and 530 nanometers wavelength is substantially blocked from reaching the eyes. The person can function normally by viewing surrounding objects using the intensity of other wavelengths of visible light.

I have determined that light wavelengths between about 480 and 530 nm. reaching the eyes at an inappropriate time with respect to the biological cycle, rather than all light wavelengths as had been previously thought, appear to be the wavelengths which cause the inappropriate resetting of the biological clock and allow the user to control, in conjunction with appropriately timed exposure to light capable of affecting the internal human clock, the timing of his normal functioning with normal wakefulness and alertness. Accordingly the present invention avoids resetting of the biological clock which would be caused by the presence of sunlight during intervals unexpected by the human body. Persons using the present invention who have crossed many time zones in a short interval such as pilots and airline passengers will be able to fly and drive with increased safety. Such persons can also attend meetings without the detriment of jet-lag dulling their thinking acuity. Thus the ability to interact completely in the local environment without the jet-lag detriment provides a major benefit.

Similarly, night workers who wish to perform at heightened levels during work shifts, or who must maintain high alertness and judgmental levels, such as medical practitioners, nuclear plant operators, truckers, train engineers, etc. will be able to function more effectively during their working hours by using the present invention.

In accordance with the present invention, a method of avoiding the influence of light on the biological clock caused by the presence of full spectrum light during intervals unexpected by the human body is comprised of wearing goggles that substantially block light having wavelengths of between about 480 and 530 nm. during exposure to the light, while conducting normal activities using visible light of other wavelengths. Preferably wavelength of between 490 and 515 are blocked.

Rather than wearing goggles, contact lenses having similar characteristics could be used.

In another embodiment of the invention contact lenses which can be worn to avoid resetting of the biological clock caused by the presence of full spectrum light during intervals unexpected by the human body is comprised of plastics which block light having wavelength of between about 480 and 530 nm.

The present invention can form flying goggles, reading glasses, driving glasses, etc., the glasses (spectacles) form of the invention preferably having side flaps for blocking light which has not passed through the light blocking material from entering the eye.

It is intended that the function of blocking light from between about 480 and 530 nm. should be construed as restricting the light of that wavelength span, since the invention may be achieved without perfect (100%) light blockage. For example, 30% transmission, 70% blockage, may be sufficient in many individuals to achieve the present invention.

A better understanding of the invention will be obtained by reference to the detailed description below, and to the following drawing, in which:

FIG. 1 is a spectral graph used to illustrate the invention.

DESCRIPTION OF THE INVENTION

A person who has moved rapidly through several time zones and wishes to avoid resetting of his biological clock, i.e. the onset of jet-lag, caused by the presence of full spectrum light during intervals unexpected by that person's body, wears a pair of goggles that substantially block light having a wavelength of between 480 and 530 nm. during exposure to that light at times that the biological clock of the wearer expects it to be dark.

FIG. 1 illustrates a representative spectrum of visible light which reaches the eye. A filter 1 blocks the aforenoted band of light wavelengths between about 480 and 530 nm. Light of the remainder of the spectrum, on both sides of the blocked band are received by the eye, while light in the aforenoted band is blocked.

For example, an airline pilot leaving the eastern North American continent midevening and flying to the United Kingdom will fly for five or six hours arriving in the U.K. at about sun-up. However the biological clock of the airline pilot is set for e.g. 2:00 a.m., expecting it to be in the middle of the night. The presence of the morning sun begins to reset his biological clock, causing jet-lag, and resulting disfunction. This is of course dangerous.

Similarly an air line pilot leaving the U.K. and travelling west experiences constant daylight during an interval when his body expects darkness due to the setting of his biological clock.

In both cases, the airline pilot would wear a pair of goggles, which is the subject of his present invention, during the hours at which his biological clock expects the environmental full spectrum light to be absent, the airline pilot while driving to the hotel and the airline pilot flying west.

In both cases the light wavelengths of between 480 and 530 nm. are blocked. The body of the pilot thus maintains its normal biological clock from its home base, and functions accordingly.

With the maintenance of the biological clock at the home base, there is no disruption when the pilot returns home. The pilots can resume their normal ground or flying activities within that time zone as if there had been no readjustment of their biological clocks, and therefore there is no jet-lag. Stress and disfunction of their bodies is thus minimized.

However, since only wavelengths of between 480 and 530 nm. are substantially blocked, the remaining light wavelengths pass into the eye, during wearing of the goggles and the wearer can see and conduct normal activities using the visible light of the other wavelengths. He is therefore not inhibited from normal functioning as was the case in the prior art.

Therefore an airline pilot can rapidly adjust his biological clock, using light and the goggles, so that the alertness cycle (subjective day) is tuned to the time of the flight, or use the goggles to maintain the home port sleep-wake schedule to ensure proper quality of sleep in rapid turnaround situations without the reduced functioning due to the desynchronization of the sleep-wake cycle with the activity cycle caused by the undesired resetting of the clock by light during subject night.

It should be noted in the present invention restricted wavelength goggles, contact lenses or glasses can be used. Since in the goggles and contact lenses forms of the invention all light entering the eye must pass through the light restricting (blocking) material, there is no requirement for additional side restriction. However in the reading glasses form of the invention, there is ample space for environment light to enter the eye from between the rim of the glasses and the face. For this embodiment, it is preferred that there should be at least light blocking side flaps affixed to or forming part of the glasses for blocking light which has not passed through the light blocking material, from entering the eye.

The light blocking material can be formed into the lenses of the goggles, contact lenses or glasses themselves, or filters, such as gel filters can be coated on or fixed to clear lenses, or removably attached to them as in a pair of sunglasses which attach to spectacles. A number 31 or 35 gel filter which is available from Rosco Laboratories Ltd., of Markham, Ontario, Canada, has been found to effectively and sufficiently block light having wavelengths of between 480 and 530 nm., and may be fixed to the lenses of goggles or spectacles to form the present invention.

A person understanding this invention may now conceive of alternative structures and embodiments or variations of the above. All of those which fall within the scope of the claims appended hereto are considered to be part of the present invention.

I claim:

1. A method of avoiding the influence of light on the biological clock caused by the presence of full spectrum light during intervals unexpected by the human body comprising wearing goggles that substantially block light having wavelengths in a band of between about 480 and 530 nm. during exposure to said light while allowing visible light having wavelength outside and on each side of said band to pass, while conducting normal activities using said visible light outside said band.

2. A method as defined in claim 1 in which said normal activities include flying an airplane.

3. A method as defined in claim 1 in which said normal activities include driving a car.

4. A method as defined in claim 1 in which said blocking step includes providing a blocking filter of about between 480 and 530 nm. attached to a pair of lenses.

5. A method as defined in claim 4 in which said blocking filter is a gel coating on a light transmissive glass or plastic lens.

6. A method as defined in claim 1 in which the wavelengths are between 490 and 515 nm.

7. A method as defined in claim 1 in which said goggles are comprised of a plastics material which allow visible light to pass therethrough, but substantially block light between about 480 and 530 nm.

8. A method as defined in claim, 7 in which the wavelengths are between 490 and 515 nm.

9. A method of avoiding the influence of light on the biological clock caused by the presence of full spectrum light during intervals unexpected by the human body comprising wearing contact lenses that substantially block light having wavelengths in a band of between about 480 and 530 nm. during exposure to said light while allowing visible light having wavelength outside and on each side said band to pass, while conducting normal activities using said visible light outside said band.

10. Contact lenses which can be worn to avoid the influence of light on the biological clock caused by the presence of full spectrum light during intervals unexpected by the human body comprising plastics which block visible light in a band having wavelengths of between 480 and 530 nm. and allowing visible light having wavelengths outside and on each side of said band to pass.

11. Lenses as defined in claim 10 in which the wavelengths are between 490 and 515 nm.

12. Flying goggles comprised of material which blocks light in a band having wavelengths of between about 480 and 520 nm. While allowing light having wavelengths outside and on each side of said band to pass.

13. Contact lenses comprised of material which blocks light in a band having wavelengths of between about 480 and 520 nm. while allowing light having wavelengths outside and on each side of said band to pass.

14. Lenses as defined in claim 13 in which the wavelengths are between 490 and 515 nm.

15. Reading glasses having lenses comprised of material which blocks visible light in a band having wavelengths of between about 480 and 530 nm. while allowing light having wavelengths outside and on each side of said band to pass, and includes light blocking side flaps for blocking light which has not passed through said material from entering the eye.

16. Glasses as defined in claim 15 in which the wavelengths are between 490 and 515 nm.

17. Driving glasses having lenses comprised of material which blocks light having wavelengths in a band of between about 480 and 530 nm. while allowing light having wavelengths outside and on each side of said band to pass, and includes light blocking side flaps for blocking light which has not passed through said material from entering the eye.

18. Glasses as defined in claim 17 in which the wavelengths are between 490 and 515 nm.

* * * * *